Figure 1:
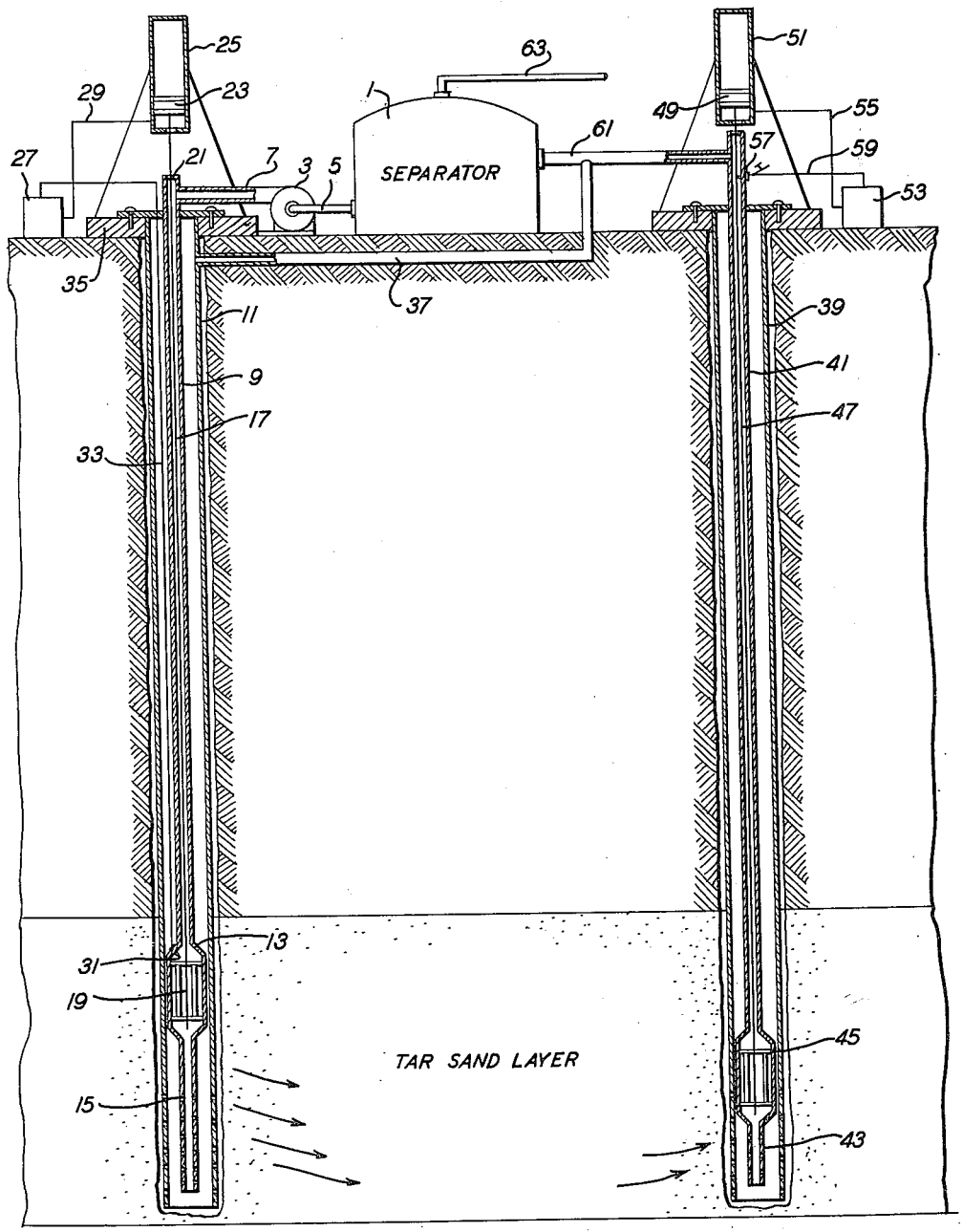

March 5, 1963  M. L. NATLAND  3,079,995
PETROLEUM RECOVERY FROM SUBSURFACE OIL-BEARING FORMATION
Filed April 16, 1958  2 Sheets-Sheet 2

INVENTOR.
MANLEY L. NATLAND
BY
Adams, Forward and McLean
ATTORNEYS

United States Patent Office 3,079,995
Patented Mar. 5, 1963

3,079,995
PETROLEUM RECOVERY FROM SUBSURFACE OIL-BEARING FORMATION
Manley L. Natland, Rolling Hills, Calif., assignor to Richfield Oil Corporation, Los Angeles, Calif., a corporation of Delaware
Filed Apr. 16, 1958, Ser. No. 728,890
1 Claim. (Cl. 166—11)

The present invention relates to a novel method of heating and pressurizing subsurface oil-bearing formations. More particularly, the present invention pertains to a method of recovering the petroleum contained in the subsurface formation by introducing heated water into the formation; the water being heated to the desired extent by passage through a nuclear reactor positioned in a well bore traversing the subsurface oil-bearing strata. The heated water thus forced into the formation serves not only as a means of reducing the viscosity of the petroleum contained therein but also as a drive to promote the movement of the petroleum into one or more adjacent output bore holes.

In the past many methods have been proposed to recover the oil remaining in subsurface oil-bearing formations after primary recovery methods, e.g. flowing and pumping, have ceased to economically produce the oil. Among these secondary recovery methods has been various water flooding techniques wherein water is forced into the oil-bearing formation under pressure through one or more input wells and the petroleum, displaced by the water and driven outwardly from the water injection site, is recovered through one or more adjacent output bore holes. Also various techniques of heating the petroleum contained in the subsurface strata in order to render it less viscous and therefore more easily recoverable have been proposed. Among these have been the suspension of electrical heaters in proximity to the formation, the ignition of combustible gases in a bore hole or oil-bearing formation, and the in situ burning in the formation of petroleum residues.

Now in accordance with the present invention I have provided a means whereby the subsurface oil-bearing formation is simultaneously heated and pressurized thus bringing about increased recoveries of the petroleum contained therein, both results being accomplished by a unique water flooding method. Briefly, the present invention comprises introducing water down a tubing string suspended in a well bore, through a self-sustained nuclear reactor positioned in the tubing string and thence outwardly into the oil-bearing formation adjacent the well bore. The water during its passage through the reactor flows between and around the fissionable elements and comes into moderating and heat exchange relationship therewith, thus acting as a reactor coolant and moderator while carrying away the heat produced by the nuclear fission taking place within the reactor. The water heated in this manner passes into the formation wherein it serves to render less viscous the oil contained in the formation. The hot water thus forced into the formation also serves as a pressure drive to facilitate the movement of the oil through the formation and to the surrounding output wells in which, if desired, can also be suspended a similar nuclear reactor or other means for heating the recovered oil and further reducing its viscosity in order to facilitate transportation to the earth's surface. Oil and water separation equipment can be provided at the earth's surface and the water thus separated can be reintroduced into the input well or wells and the separated oil can be employed as a refinery charge stock. The water as hereinafter explained in more detail not only serves as a coolant for the nuclear reactor and as a pressurizing medium for the oil-bearing formation, but also acts as a neutron moderator to reduce the velocities of the neutrons in the nuclear reaction system in order to provide a self-sustained thermal reactor.

Figure 2:
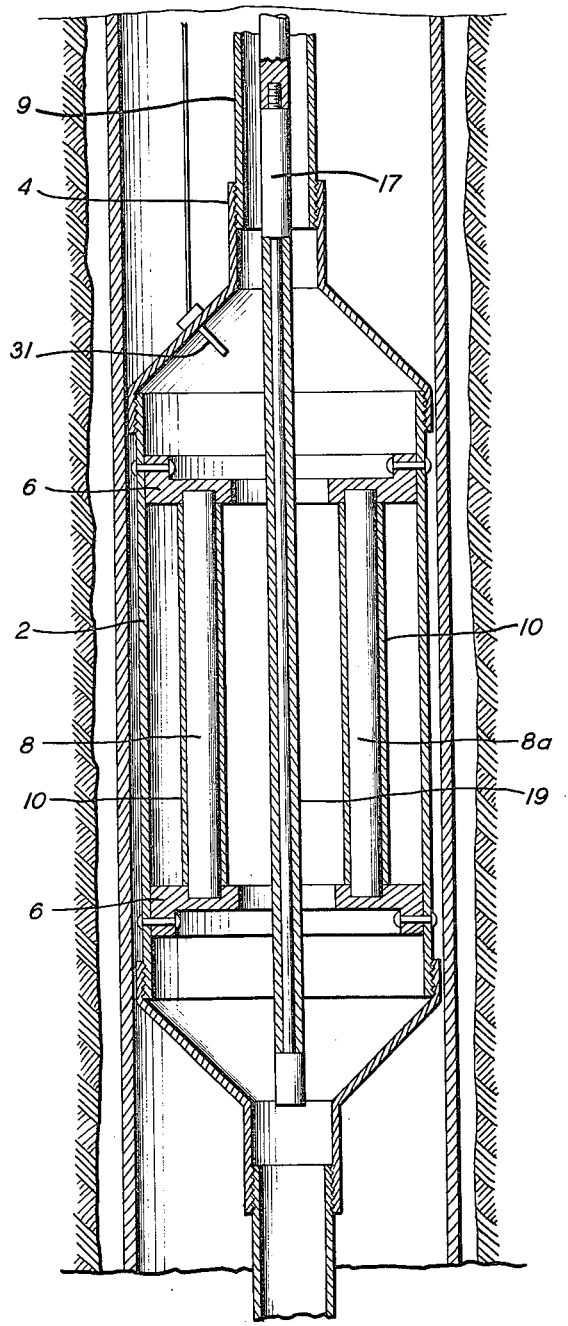

The above-described method and an apparatus for effecting the method can best be defined by reference to the following figures wherein:

FIGURE 1 is a diagrammatic view partially in cross-section of an apparatus for effecting the present method; and FIGURE 2 is a cross-sectional view of one embodiment of a nuclear reactor to be positioned as shown in FIGURE 1.

The apparatus for achieving the present invention of heating and pressurizing the oil-bearing subsurface for mation and facilitating the recovery of oil therefrom can comprise a water-oil separating tank 1 located at the earth's surface, pumping means 3 and lines 5 and 7 connecting the tank 1 to pump 3 and pump 3 to tubing string 9 extending into the cased input bore hole 11. Tubing string 9 has positioned therein nuclear reactor 13. It is to be understood, however, that any number of similar nuclear reactors can be used in tubing string 9, the number depending upon the intensity of the fission reaction and the temperature to which the subsurface formation and the water is to be heated. It is preferred that the reactor be positioned in proximity to the oil-bearing strata although this is not necessary. Also it is to be noted that input bore hole 11 can be uncased if desired and the bore hole can be of any diameter sufficient to accommodate the nuclear reactor, e.g. six feet if necessary.

Near the lowermost end of the tubing string 9 opposite the oil-bearing formation and below the nuclear reactor 13 are provided perforations 15 for the emission of the heated water from the string 9. Similar perforations are provided in the adjacent bore hole casing. Extending from the earth's surface and down the length of tubing string 9 and into the nuclear reactor is provided movable control rod 17. Rod 17 has affixed at the lower end thereof a neutron absorbing portion 19. Portion 19, as hereinafter explained in more detail, is composed of a material having a high neutron capture cross-section, e.g. boron 10, and is provided in amounts sufficient to effectively control the nuclear fission reaction. The upper end of rod 17 extends through packing gland 21 at the top of tubing string 9 and is attached by any suitable means to piston 23 operating within cylinder 25. Piston 23 can be activated by any suitable means such as pump 27 through which a fluid medium is transmitted by way of line 29. At any convenient location within the nuclear reactor 13 is located a thermocouple within thermowell 31. This thermocouple can be in electrical communication with a temperature responsive device (not shown) by means of cable 33. The temperature responsive device can be attached to a solenoid or similar device within pump 27 which in turn serves to automatically activate the pump 27 in response to the temperature in reactor 13 which in turn operates piston 23, thereby raising or lowering rod 17 and the absorbing portion 19 into or out of the reactor 13. The bore hole can be suitably sealed at the surface as by a concrete and steel cap 35. Provided at the top of the bore hole casing 11 is return pipe 37 leading to separator 1, thus permitting the heated water to return to the surface without passing through the adjacent formation when such flow is desired.

Located at spaced intervals around the input bore hole 11 there is provided one or more cased or uncased output bore holes 39. Any number of output bore holes can be provided although it is preferred to utilize the conventional five-spot arrangement. The oil and water flowing into the output bore hole 39 can be brought into tubing string 41 as through perforation 43. Provided in tubing string 41 is nuclear reactor 45 and it can be similar to reactor 13 provided in tubing string 9. This reactor serves to further lower the viscosity of the petroleum passing up the output bore hole 39. The reactor is controlled by means similar to those described above. For instance reactor control rod 47 having a neutron absorbing portion on its lower end can be attached to piston 49 operating within cylinder 51 and the movement of piston 49 controlled as through pump 53 and fluid connecting line 55. The pump 53 can be activated by a thermocouple in thermowell 57 leading into tubing string 41 and operatively associated with pump 53 by conductor 59. The oil and water drawn from tubing string 41 can be conducted to separator tank 1 by means of line 61 and the oil production can be removed and sent to refining operations by means of line 63. It is, of course, not necessary to provide the output bore hole with this arrangement of reactor, tubing string, etc., as they can be completely omitted and the oil recovered by the usual pumping or lifting methods if its viscosity permits.

The water, for introduction into the input bore hole, can be obtained from any suitable source such as water-producing wells drilled nearby. The water can be substantially pure or it can contain various components such as sodium chloride or surfactants for facilitating the displacement of the petroleum in the formation. The extent of these various impurities must, of course, be correlated with the water's moderating effect in the reactor with the absorption cross-section and scattering cross-section of the water being adjusted so as to permit a self-sustained nuclear reaction. The pressure to be maintained on the water and the temperature to which it is to be raised are, of course, primarily dependent on the permeability of the formation to be treated and the viscosity of the petroleum contained therein; the exact figures varying from formation to formation. Generally the water should be heated to an elevated temperature of up to about 600° F., preferably about 200 to 600° F., and the pressure in the reactor 13 should be at least sufficient to maintain the water in the liquid phase in the reactor. In some instances, however, it may be desirable that the water exit from the reactor as steam and pass into the formation as a steam drive.

The present method of treatment can be applied to any oil-bearing formation in which normal water flooding techniques would be beneficial or to any of those formations wherein the viscosity of the oil contained therein is such that heating will improve the petroleum recovery. For instance, the present mode of treatment can be advantageous when applied to loose unconsolidated tar sands such as the Athabasca tar sands in Canada, in which the oil can have gravities of about 5 to 15° API.

The nuclear reactor for use in the present method can comprise any of these known to the art which is capable of affecting a controlled self-sustained nuclear fission reaction and through which water can be passed. For instance, the reactor can be a slow or intermediate reactor and it can be constructed in accordance with any of the specifications taught by the art. Although the present invention contemplates the use of homogeneous reactors they are preferably to be avoided due to the necessity of providing a closed flow circuit for the fissionable slurry and to the necessity for maintaining the cooling water and the fissionable slurry separate. Hence the preferred reactor for use in the present invention is of the slow, i.e. thermal heterogeneous type.

In these reactors, i.e. thermal heterogeneous, the thermalization of the high velocity fission neutrons is generally accomplished by providing a material in the reaction system which acts as a buffer upon which the high velocity neutrons will expand some of their energies yet will not be captured or absorbed thereby. In other words, when high energy neutrons contact the nuclei of the buffering or moderating material they will rebound in an elastic manner thereby losing part of their energies or velocities with each collision, but yet the nature of the moderating nuclei is such that they will not capture the neutrons. In the past various materials such as beryllium, deuterium and water have been used for this purpose. When the high energy level fission neutrons have been reduced to the thermal energy of the particular system they will be absorbed by the fissionable isotope nuclei, resulting in the fission of the nuclei with the production of about two additional fast or high energy level neutrons and energy in the form of heat. Thus it can be seen that due to this neutron reproduction factor of about two for every neutron used in causing fission, a self-sustained nuclear chain reaction can be established. In order to control this chain reaction and to prevent undesirable effects this neutron reproduction factor must be maintained at about unity of slightly above with control of the neutron reproduction factor being generally accomplished by introducing into the reactor a material which will poison the system and remove to the desired extent excessive neutrons. Such a material is termed a neutron absorber. Usually boron or cadmium shaped in the form of movable rods for insertion or withdrawal from the interior of the reactor are provided to accomplish this purpose. As mentioned above, each nuclear fission produces large amounts of energy in the form of heat which tends to build up in the fissionable elements of the reactive core and if left to accumulate can result in the destruction of the geometry of the system and the deterioration of the chain reaction. It has therefore been found advantageous to provide some means to remove all or a portion of the heat thus generated. In order to attain this heat removal various coolant fluids such as air, water, liquid sodium, mercury, etc., have been passed in heat exchange relationship through the interior of the reactor and around the fissionable elements.

Referring now to FIGURE 2, I have shown a nuclear reactor of the general type described above wherein both the moderation of the high energy level neutrons and the cooling of the reactive system are accomplished by the circulation of water therethrough. As the water passes through the reactor the high energy level fission neutrons are moderated to thermal energies by collision with the nuclei of the water and the water serves to absorb a part of the heat of the fission reaction thus cooling the reactor and raising the temperature of the water. The rate of fission and ultimately the temperature of the water can be regulated by the insertion or withdrawal of neutron absorbing rod 19 from the interior of the reactive core. The critical formulae and relationships for constructing the nuclear reactor hereinafter described are readily available in publications such as "The Reactor Handbook," vol. 122, U.S. Atomic Energy Commission, declassified edition, 1955 (AECD-3647), "The Elements of Nuclear Reactor Theory" by Gladstone & Edlund, 1952 and "Introduction to Nuclear Engineering" by Richard Stephenson, 1954, and need not be gone into in great detail at this point. Although some of the figures are given for different variables in the construction of the reactor they are not to be considered as limiting or final but only for the purposes of illustration.

The reactor comprises a reactor casing 2 made of a suitable heat resistant ceramic or similar material. Preferably, the reactor case 2 will have embedded therein a neutron reflecting material such as graphite or beryllium in amounts sufficient to substantially reduce the number of neutrons escaping from the system. Alternatively, of course, a layer of graphite or beryllium could be placed on the inside or outside of the casing. The thickness of this layer will, in most cases, be determinative of the size of the reactor and the amount of fissionable fuel necessary to form a critical mass. For instance, the thicker this layer, the fewer neutrons lost from the system by escape and hence the lower the mass necessary to go critical and the smaller the diameter of the reactor. If this layer of reflecting material is about 10 to 12 inches thick the mass of U235 necessary to go critical can be reduced to about 2 to 4 kilograms and the diameter of the reactive section can be within the range of about two to six feet. Reactor case 2 is suitably held in position in tubing string 9 by means of threaded connections 4. Within the reactor case 2 there are suspended and held in position by bracket means 6 affixed to the interior wall of the reactor case 2 cylindrical fissionable elements 8 and 8A. It is to be understood, however, that the number of fissionable elements is not to be limited to two but rather there will in all probability be at least as many as 15 to 20 fissionable elements suspended by similar means. The fissionable elements can be contained in a protective cladding 10. Cladding 10 will normally be sponge zirconium of 0.004 inch to 0.04 inch thickness metallurgically bonded to the fuel element with a 10% molybdenum-90% uranium bonding agent. This cladding need not be so limited, however, but can be any other non-corrosive metal or alloy such as aluminum or stainless steel.

The fuel elements can be composed of enriched uranium with the enrichment being about 20% U235 or other fissionable isotope and 80% U238. The U235 enrichment can, of course, be substantially greater than this; for instance, up to about 90%. In any event, the total mass of U235 in the fuel elements can be about 8 kilograms and this can be distributed equally between the fissionable elements. If say 16 elements are used to construct the critical assembly each element can be about 3 inches in diameter and about 36 inches long with the elements arranged in a square lattice with a 1 inch clearance between adjacent elements. If arranged in this manner the active core will be about 19 inches square. Protruding within the interior of the reactor case 2 is thermowell 31 containing a thermocouple. Thermowell 31 can, of course, be provided at any convenient location in or near the reactor case 2. Passing down the tubing string 9 and into the interior of the reactor 2 is rod 17 having affixed at the end thereof neutron absorbing portion 19. Portion 19 can be composed of any metal having a high neutron capture cross-section such as cadmium or boron. The interior of the reactor is free from undue obstructions so that the water pumped down tubing string 9 has an open access through the reactive case and around the fissionable elements 8 and 8A. An initial source or neutrons can be placed within the reactive case if desired and it can be positioned at any convenient location such as around the periphery of the reactive mass.

The operation of the present method can be described as follows. After the tubing string 9 having the nuclear reactor 13 suspended therein has been positioned at the proper location the water flow can be started down the tubing string, through the reactor and out into the formation. When initially positioned rod 17, of course, will be fully inserted into the reactor 13. When the desired water flow has been established the neutron absorbing portion 19 of the control rod 17 can be withdrawn from the reactor 13 by the action of pump 27 and by piston 23. As the absorbing material is withdrawn from the active core the neutron flux will build up and the fission reaction can become self-sustained. The heat generated by the fission reaction will serve to raise the temperature of the water passing through the reactor to the level desired. The flow of water through the reactor will be under a head of pressure sufficient to force the thus heated water through the perforations of the tubing string and the well casing and into and through the surrounding formation. When more than the desired degree of heat is being produced by the nuclear reactor the thermocouple 31 located in the interior of the reactor 2 will transmit the temperature to a temperature responsive device located at the above-surface pump 27, the temperature responsive device activating a solenoid which in turn activates the pump 27. Activation of the pump withdraws fluid from beneath the piston 23 and lowers the control rod 17 and neutron absorber 9 into the reactor 2, thereby stopping or slowing down the fission reaction and causing a lowering of the temperature. When the temperature is below that desired, the reverse pattern will be followed in activating the pump 27 so as to raise piston 23, thereby raising the control rod 17 from the reactor 2 and increasing the rate of fission. In this manner the rate of fission and therefore the temperature can be controlled to any desired extent. The flow of hot water into the formation will act to displace the petroleum contained therein thus driving it forward and toward the spaced apart output wells while the high temperature of the water will serve to heat the thus displaced petroleum thereby reducing its viscosity and rendering it more easily recoverable. Not only will the hot water enhance the flowability of the petroleum but also the nuclear reactor by its placement adjacent the formation to be treated may serve as an additional heating means and further improve the recoveries of petroleum.

In the system as shown I have also provided an auxiliary cooling circuit for the nuclear reactor to be used in case of emergencies or when otherwise desired. Referring again to FIGURE 1, it can be seen that I have provided pipe 37 connected to the annulus formed by the tubing string 9 and the well casing 11. Pipe 37 leads to separator 1 and has a valve connected therein. If the temperature of the reactor increases to an undesirable extent the water flowing therethrough can be routed back up the annulus rather than through the formation, thus producing an additional cooling flow of liquid around the exterior of the reactor. If such flow is not desired or needed, however, the input well bore can be blocked off immediately above the nuclear reactor as by closing the valve in line 37 or by the insertion of appropriate packers in the tubing-casing annulus (not shown) thereby greatly reducing the quantity of water needed in the overall method. The petroleum as noted previously is recovered through the spaced apart output bore holes and the water and oil separated at the surface of the earth in separator 1.

I claim:

In a method for heating and recovering petroleum contained in a subsurface oil-bearing formation, the steps which comprise providing input and output bore holes to the formation, positioning in the input bore hole a controlled, water-cooled, water-moderated, self-sustained, thermal neutronic reaction means, passing water into the input bore hole through the said neutronic reaction means in order to cool and moderate the reactor and thence outwardly into the formation while effecting a controlled thermal fission reaction in the said reaction means, said water being maintained under a pressure sufficient to establish a water drive through the oil-bearing formation and recovering petroleum from the output bore hole.

References Cited in the file of this patent

UNITED STATES PATENTS

| | | |
|---|---|---|
| 2,743,224 | Ohlinger | Apr. 24, 1956 |
| 2,780,449 | Fischer et al. | Feb. 5, 1957 |
| 2,788,071 | Pelzer | Apr. 9, 1957 |
| 2,830,944 | Wigner et al. | Apr. 15, 1958 |
| 2,832,732 | Wigner | Apr. 29, 1958 |
| 2,858,890 | McMahon | Nov. 4, 1958 |

FOREIGN PATENTS

| | | |
|---|---|---|
| 1,147,517 | France | June 11, 1957 |